United States Patent [19]

Swaminathan et al.

[11] 4,232,937
[45] Nov. 11, 1980

[54] BRIGHT FIELD-DARK FIELD ILLUMINATION SYSTEM

[75] Inventors: Krishnaiyer Swaminathan, Santa Monica, Calif.; Milton H. Sussman, Amherst, N.Y.

[73] Assignee: American Optical Corporation, Southbridge, Mass.

[21] Appl. No.: 951,684

[22] Filed: Oct. 16, 1978

[51] Int. Cl.³ .................................................. G02B 21/06
[52] U.S. Cl. ...................................................... 350/91
[58] Field of Search .................. 350/9, 89, 34, 91, 87, 350/236

[56] References Cited

U.S. PATENT DOCUMENTS

| | | | |
|---|---|---|---|
| 1,840,448 | 1/1932 | Heine | 350/91 |
| 1,943,510 | 1/1934 | Bauerfield et al. | 350/34 |
| 2,079,621 | 5/1937 | Land | 350/91 |
| 3,646,608 | 2/1972 | Rowland | 350/235 |
| 3,752,560 | 8/1973 | Lunn | 350/91 |
| 3,799,645 | 3/1974 | Stankewitz | 350/87 |
| 4,033,666 | 7/1977 | Shoemaker | 350/91 |
| 4,109,999 | 8/1978 | Keyono et al. | 350/91 |
| 4,148,552 | 4/1979 | Suzuki et al. | 350/34 |
| 4,160,578 | 7/1979 | Gottlieb et al. | 350/91 |

Primary Examiner—John K. Corbin
Assistant Examiner—B. Wm. de los Reyes
Attorney, Agent, or Firm—Jeremiah J. Duggan; Alan H. Spencer

[57] ABSTRACT

An illumination system for bright field/dark field microscopy has a swinging deflector which is normally positioned on the optical axis when bright field microscopy is used and which is swung off the optical axis when dark field microscopy is used. When the deflector is swung off the optical axis an alternate illumination axis is utilized to provide a reduced portion of the observation axis having coaxial counterflowing light passing there along.

4 Claims, 2 Drawing Figures

BRIGHT FIELD-DARK FIELD ILLUMINATION SYSTEM

BACKGROUND OF THE INVENTION

The present invention relates to microscope illuminators and more particularly to microscope illuminators for bright field/dark field microscopy with an alternate light passage for dark field microscopy.

Prior Art

U.S. Pat. No. 1,943,510 was issued Jan. 16, 1934 to Bauersfeld et al and discloses a vertical illumination system in FIG. 2 which may be used for either bright field or dark field microscopy. The vertical illumination system uses an annular mirror 12 and an occluder 19-19' to permit either bright field or dark field microscopy. The same illumination axis is used for both bright field and dark field microscopy although different portions of the path are utilized for the different types of microscopy.

U.S. Pat. No. 1,840,448 issued to Heine Jan. 12, 1932 illustrates a dark field illuminator having a beam splitter or annular reflector to direct light toward the object.

U.S. Pat. No. 2,079,621 was issued May 11, 1937 to Land and discloses an annular ring reflector used in a vertical dark field microscope illuminator.

U.S. Pat. No. 2,097,762 issued Nov. 2, 1937 to Heine and discloses an annular ring used in a vertical dark field microscope illuminator.

U.S. Pat. No. 3,752,560 issued Aug. 14, 1973 to Lunn and discloses an incident light dark field illumination system having an annular reflector with a semi-transmissive/semi-reflective central portion that may be used for bright field vertical illumination when lens 7 is removed from the optical path. The system has the same illumination axis for both dark field and bright field microscopy.

BRIEF DESCRIPTION OF THE PRESENT INVENTION AND DRAWING

The bright field/dark field illuminator of the present invention has an alternate illumination axis for dark field microscopy. By removing a conventional partially transmissive mirror used for vertical bright field illumination, light from the illuminator enters the alternate illumination axis and is reflected by an annular surface onto the object. The alternate axis provides a shorter co-axial illumination/observation path for dark field microscopy to reduce noise caused by adjacent light rays traveling in opposite directions.

FIG. 1 is an optical diagram of the illuminator showing its location in an incident microscope system and FIG. 2 is an enlargement of the portion of the illumination system showing the movable mirror.

DETAILED DESCRIPTION OF THE PRESENT INVENTION

Figure 1:
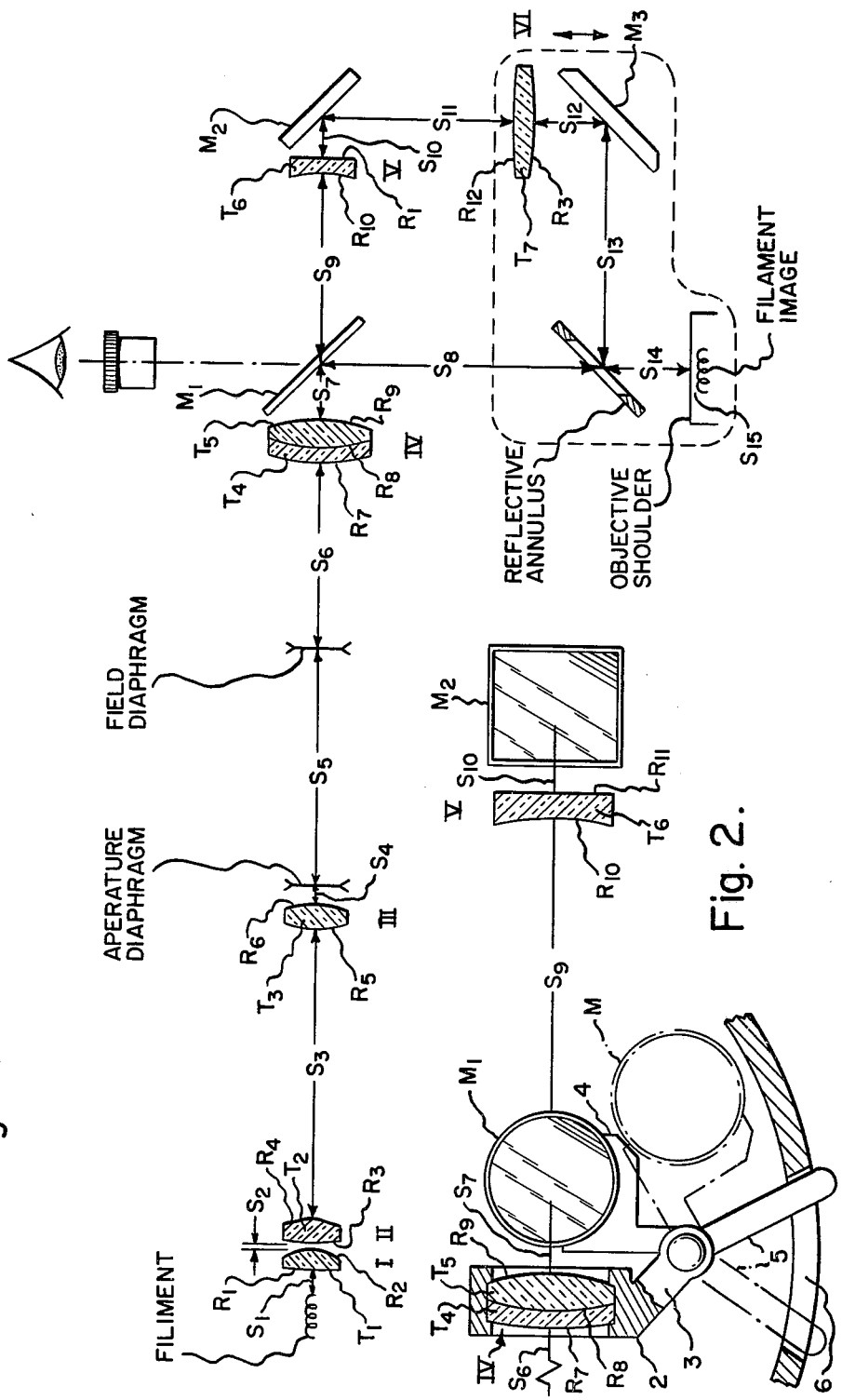

Referring to FIG. 1, light from the filament is collected by lenses I and II, modified by lens III and, after passing through the aperture diaphragm and field diaphragm, the filament image is focused by double IV, near the shoulder of the objective for bright field microscopy. Semi-transmissive mirror 1, is located between the microscope objective and eyepiece to deflect light from lens IV along the observation axis toward the objective. Although the objective of an infinity-corrected microscope moves for focusing which changes the relative position of the filament image with respect to the objective shoulder, the location of the filament image is not critical for bright field microscopy.

Figure 2:
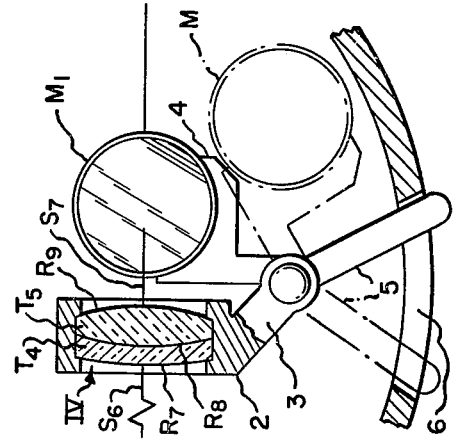

Referring to FIG. 2 microscope body 1 has lens holder 2 positioned therein to position lens IV. Support 3 extends from lens holder 2 and has mirror mount 4 pivotably connected thereto. Arm 5 from mirror mount 4 extends through opening 6 in microscope body 1. When desiring to practice dark field microscopy, the observer swings mirror 1 off the observation axis by shifting arm 5 to the position shown in dotted outline.

Referring again to FIG. 1, light passes along the alternate illumination axis represented by spacings 9, 10, 11, 12 and 13, when mirror $M_1$ is swung off the observation axis. Lens V collimates light received from lens IV and mirror $M_2$ deflects the light along a path parallel to observation axis. Positive lens VI receives the collimated light from mirror $M_2$ which is then deflected by mirror $M_3$ and the reflective annulus near the objective shoulder. In infinity-corrected microscopes, the nosepiece containing the objective moves for focusing. By providing a collimated zone between mirror $M_2$ and lens VI, the position of the image reflected by the reflective annulus maintains the same relative position with respect to the objective shoulder. This position critical for dark field microscopy.

The parameters of the illumination system are set forth in the Table below. The Table is divided into two sections, with bright filed parameters being on the left and dark field parameters being on the right. Lens radii are designated $R_1$-$R_{13}$, wherein a minus sign (−) applies to a surface whose center of curvature lies away from the filament side of its respective vertex. Successive axial spacings are designated $S_1$-$S_{15}$ and lens thicknesses are designated $T_1$-$T_7$. Radii, thicknesses and axial spacings are all in millimeters. The indices of refraction and Abbe numbers of the glasses are designated $ND_1$-$ND_7$ and $\nu_1$-$\nu_7$, respectively.

TABLE

| Lens | Radius (R) | Thickness (T) | Spacing (S) | Index of Refraction (ND) | Abbe No. ($\nu$) |
|---|---|---|---|---|---|
| | | | BRIGHT FIELD | | |
| | | | $S_1 = 8.00$ | | |
| | $R_1 = 89.448$ | | | | |
| I | | $T_1 = 4.5$ | | $ND_1 = 1.523$ | $\nu_1 = 58.6$ |
| | $R_2 = -9.269$ | | | | |
| | | | $S_2 = 0.10$ | | |
| | $R_3 = 40.643$ | | | | |
| II | | $T_2 = 5.0$ | | $ND_2 = 1.523$ | $\nu_2 = 58.6$ |
| | $R_4 = -16.726*$ | | | | |
| | | | $S_3 = 65.06$ | | |
| | $R_5 = 30.280$ | | | | |

TABLE-continued

| Lens | Radius (R) | Thickness (T) | Spacing (S) | Index of Refraction (ND) | Abbe No. (ν) |
|---|---|---|---|---|---|
| III | $R_6 = -30.280$ | $T_3 = 4.0$ | | $ND_3 = 1.523$ | $\nu_3 = 58.6$ |
| | | | $S_4 = 4.00$ | | |
| | | | $S_5 = 54.00$ | | |
| | | | $S_6 = 44.01$ | | |
| IV | $R_7 = 52.780$ | $T_4 = 2.5$ | | $ND_4 = 1.785$ | $\nu_4 = 25.7$ |
| | $R_8 = 22.736$ | $T_5 = 7.0$ | | $ND_5 = 1.548$ | $\nu_5 = 45.8$ |
| | $R_9 = -33.268$ | | | | |
| | | | $S_7 = 12.00$ | | |
| | | | $S_8 = 61.00$ to $75.50$ | | |
| | | | $S_{14} = 18.00$ | | |
| | | | $S_{15} = 1.64$ | | |
| V | | | | | |

DARK FIELD

| Lens | Radius (R) | Thickness (T) | Spacing (S) | Index of Refraction (ND) | Abbe No. (ν) |
|---|---|---|---|---|---|
| | | | $S_1 = 8.00$ | | |
| I | $R_1 = 89.448$ | $T_1 = 4.5$ | | $ND_1 = 1.523$ | $\nu_1 = 58.6$ |
| | $R_2 = -9.269$ | | | | |
| | | | $S_2 = 0.10$ | | |
| II | $R_3 = 40.643$ | $T_3 = 5.0$ | | $ND_2 = 1.523$ | $\nu_2 = 58.6$ |
| | $R_4 = -16.726^*$ | | | | |
| | | | $S_3 = 65.06$ | | |
| III | $R_6 = 30.280$ | $T_3 = 4.0$ | | $ND_3 = 1.523$ | $\nu_3 = 58.6$ |
| | $R_6 = -30.280$ | | | | |
| | | | $S_4 = 4.00$ | | |
| | | | $S_5 = 54.00$ | | |
| | | | $S_6 = 44.01$ | | |
| IV | $R_7 = 52.780$ | $T_4 = 2.50$ | | $ND_4 = 1.784$ | $\nu_4 = 25.7$ |
| | $R_8 = 22.736$ | $T_5 = 7.0$ | | $ND_5 = 1.548$ | $\nu_5 = 45.8$ |
| | $R_9 = -33.268$ | | | | |
| | | | $S_7 = 12.00$ | | |
| | | | $S_9 = 41.60$ | | |
| V | $R_{10} = -19.580$ | $T_6 = 2.50$ | | $ND_6 = 1.523$ | $\nu_5 = 58.6$ |
| | $R_{11} = \infty$ | | | | |
| | | | $S_{10} = 9.90$ | | |
| | | | $S_{11} = 40.88$ to $55.38$ | | |
| | $R_{12} = 115.723$ | $T_7 = 4.5$ | | $ND_7 = 1.648$ | $\nu_7 = 33.9$ |
| | $R_{13} = 115.723$ | | | | |
| | | | $S_{12} = 15.62$ | | |
| | | | $S_{13} = 51.50$ | | |
| | | | $S_{14} = 18.00$ | | |
| | | | $S_{15} = 1.64$ | | |

*aspheric surface

The surface of singlet II with radius $R_4$, is an axially symmetrical aspheric surface with Z axis of revolution. The value of Z for any given value of x and y, is defined by the equation:

$$Z = cp^2/(1 + \sqrt{1 - (k + 1)c^2p^2}) + dp^4 + ep^6 + fp^8 + gp^{10}$$

wherein
$d = 1.0181 \times 10^{-4}$
$e = -3.4136 \times 10^{-7}$
$f = 3.107 \times 10^{-8}$
$g = -2.9372 \times 10^{-9}$
$p^2 = x^2 + y^2$
$c = 1R_4$ and
$k = -1.0$ The mathematical support for this formula and explanation may be found in the Military Standard Handbook, MIL-HBDK-141 (50CT62), Sec. 5.5.1, Page 5–13 to 5–21.

What is claimed is:

1. A vertical bright-field and dark-field microscope illuminator having a light source and a microscope objective with a shoulder aligned on an optical axis, which comprises, a first lens system for collecting light from the source, a second lens system for receiving light from said first lens system and focusing an image of the source, a partially transmissive mirror selectively positionable on the optical axis to deflect light from said second lens system toward the objective for bright-field microscopy, an annular reflector located on the optical axis near the objective, an alternate optical axis used when said mirror is positioned off the optical axis, a relay system on said alternate optical axis to focus light presented to said annular reflector near the objective shoulder for dark-field microscopy.

2. The vertical bright-field and dark-field microscope illuminator of claim 1 wherein the relay system has a zone of collimated light to maintain a constant relationship between the image and the objective shoulder during dark-field microscopy.

3. The vertical bright-field and dark-field microscope illuminator of claim 1 wherein said first lens system includes a biconvex positive singlet I and a biconvex singlet II with an axially-symmetrical, aspheric second surface, said second lens system includes a biconvex positive singlet III and a biconvex positive doublet IV and said relay system includes a concave-plano negative singlet V, a mirror $M_2$, biconvex positive singlet VI and a Mirror $M_3$.

4. The vertical bright-field and dark-field microscope illuminator of claim 3 having the parameters set forth below wherein successive lens radii are designated $R_1$–$R_{15}$, where a minus sign indicates a radius of center of curvature lying opposite the source filament side of its vertex, axial thicknesses of successive lens elements are designated $T_1$–$T_7$, successive axial spaces are designated $S_1$–$S_{15}$, radii, thickness and spacings all being in millimeters, refractive indicies and Abbe numbers of the successive lens elements are designated $ND_1$–$ND_7$ and $\nu_1$–$\nu_7$, respectively;

| | | | BRIGHT FIELD | | |
|---|---|---|---|---|---|
| Lens | Radius (R) | Thickness (T) | Spacing (S) | Index of Refraction (ND) | Abbe No. ($\nu$) |
| | | | $S_1 = 8.00$ | | |
| I | $R_1 = 89.448$ | $T_1 = 4.5$ | | $ND_1 = 1.523$ | $\nu_1 = 58.6$ |
| | $R_2 = -9.269$ | | | | |
| | | | $S_2 = 0.10$ | | |
| | $R_3 = 40.643$ | | | | |
| II | | $T_2 = 5.0$ | | $ND_2 = 1.523$ | $\nu_2 = 58.6$ |
| | $R_4 = -16.726$* | | | | |
| | | | $S_3 = 65.06$ | | |
| | $R_5 = 30.280$ | | | | |
| III | | $T_3 = 4.0$ | | $ND_3 = 1.523$ | $\nu_3 = 58.6$ |
| | $R_6 = -30.280$ | | | | |
| | | | $S_4 = 4.00$ | | |
| | | | $S_5 = 54.00$ | | |
| | | | $S_6 = 44.01$ | | |
| | $R_7 = 52.780$ | | | | |
| IV | | $T_4 = 2.5$ | | $ND_4 = 1.785$ | $\nu_4 = 25.7$ |
| | $R_8 = 22.736$ | | | | |
| | | $T_5 = 7.0$ | | $ND_5 = 1.548$ | $\nu_5 = 45.8$ |
| | $R_9 = -33.268$ | | | | |
| | | | $S_7 = 12.00$ | | |
| | | | $S_8 = 61.00$ to $75.50$ | | |
| | | | $S_{14} = 18.00$ | | |
| | | | $S_{15} = 1.64$ | | |
| V | | | | | |

| | | | DARK FIELD | | |
|---|---|---|---|---|---|
| Lens | Radius (R) | Thickness (T) | Spacing (S) | Index of Refraction (ND) | Abbe No. ($\nu$) |
| | | | $S_1 = 8.00$ | | |
| I | $R_1 = 89.448$ | $T_1 = 4.5$ | | $ND_1 = 1.523$ | $\nu_1 = 58.6$ |
| | $R_2 = -9.269$ | | | | |
| | | | $S_2 = 0.10$ | | |
| | $R_3 = 40.643$ | | | | |
| II | | $T_3 = 5.0$ | | $ND_2 = 1.523$ | $\nu_2 = 58.6$ |
| | $R_4 = -16.726$* | | | | |
| | | | $S_3 = 65.06$ | | |
| | $R_6 = 30.280$ | | | | |
| III | | $T_3 = 4.0$ | | $ND_3 = 1.523$ | $\nu_3 = 58.6$ |
| | $R_6 = -30.280$ | | | | |
| | | | $S_4 = 4.00$ | | |
| | | | $S_5 = 54.00$ | | |
| | | | $S_6 = 44.01$ | | |
| | $R_7 = 52.780$ | | | | |
| IV | | $T_4 = 2.50$ | | $ND_4 = 1.784$ | $\nu_4 = 25.7$ |
| | $R_8 = 22.736$ | | | | |
| | | $T_5 = 7.0$ | | $ND_5 = 1.548$ | $\nu_5 = 45.8$ |
| | $R_9 = -33.268$ | | | | |
| | | | $S_7 = 12.00$ | | |
| | | | $S_9 = 41.60$ | | |
| | $R_{10} = -19.580$ | | | | |
| V | | $T_6 = 2.50$ | | $ND_6 = 1.523$ | $\nu_5 = 58.6$ |
| | $R_{11} = \infty$ | | | | |
| | | | $S_{10} = 9.90$ | | |
| | | | $S_{11} = 40.88$ to $55.38$ | | |
| | $R_{12} = 115.723$ | | | | |
| | | $T_7 = 4.5$ | | $ND_7 = 1.648$ | $\nu_7 = 33.9$ |
| | $R_{13} = 115.723$ | | | | |
| | | | $S_{12} = 15.62$ | | |
| | | | $S_{13} = 51.50$ | | |
| | | | $S_{14} = 18.00$ | | |
| | | | $S_{15} = 1.64$ | | |

*aspheric surface

\* \* \* \* \*